United States Patent
Zhang et al.

(10) Patent No.: US 10,311,291 B2
(45) Date of Patent: Jun. 4, 2019

(54) FACE RECOGNITION METHOD, DEVICE AND COMPUTER READABLE STORAGE MEDIUM

(71) Applicant: ZTE CORPORATION, Guangdong (CN)

(72) Inventors: Xiaoliang Zhang, Guangdong (CN); Lei Feng, Guangdong (CN); Weishan Sun, Guangdong (CN)

(73) Assignee: ZTE CORPORATION, Shenzhen (CN)

( * ) Notice: Subject to any disclaimer, the term of this patent is extended or adjusted under 35 U.S.C. 154(b) by 130 days.

(21) Appl. No.: 15/512,453

(22) PCT Filed: Jan. 23, 2015

(86) PCT No.: PCT/CN2015/071507
§ 371 (c)(1),
(2) Date: Mar. 17, 2017

(87) PCT Pub. No.: WO2015/131712
PCT Pub. Date: Sep. 11, 2015

(65) Prior Publication Data
US 2017/0308738 A1     Oct. 26, 2017

(30) Foreign Application Priority Data
Sep. 19, 2014   (CN) .......................... 2014 1 0483249

(51) Int. Cl.
*G06K 9/00*     (2006.01)

(52) U.S. Cl.
CPC ..... *G06K 9/00288* (2013.01); *G06K 9/00201* (2013.01); *G06K 9/00221* (2013.01);
(Continued)

(58) Field of Classification Search
CPC .......... G06K 9/00288; G06K 9/00201; G06K 9/00295; G06K 9/00221; G06K 9/00228; G06K 9/00248; G06K 2209/27
(Continued)

(56) References Cited

U.S. PATENT DOCUMENTS

| 7,221,809 B2 * | 5/2007 | Geng | ................ G06K 9/00201 345/419 |
| 8,208,010 B2 * | 6/2012 | Nelson | ...................... G06T 1/00 348/14.01 |

(Continued)

FOREIGN PATENT DOCUMENTS

| CN | 101236599 A | 8/2008 |
| CN | 102306288 A | 1/2012 |
| CN | 102663349 A | 9/2012 |

OTHER PUBLICATIONS

Publication to Findling, et al "Towards Secure Personal Device Unlock Using Stereo Camera Pan Shots", Springer, pp. 417-425. (Year: 2013).*

(Continued)

*Primary Examiner* — Daniel G Mariam
(74) *Attorney, Agent, or Firm* — Marshall, Gerstein & Borun LLP

(57) ABSTRACT

A face recognition method, device and a computer-readable storage medium are provided. The face recognition method includes: capturing face images of a user at a plurality of preset positions respectively; storing the face images and the preset positions corresponding to the face images; determining, in face recognition, one of the preset positions where the image is to be captured, and capturing a current face image of the user at the determined preset position; searching a corresponding face image in a storage device according to (Continued)

the determined preset position; and determining whether the current face image is matched with the searched face image.

18 Claims, 8 Drawing Sheets

(52) U.S. Cl.
CPC ..... G06K 9/00228 (2013.01); G06K 9/00295 (2013.01); *G06K 2209/27* (2013.01)

(58) Field of Classification Search
USPC .......................................... 382/118, 209, 218
See application file for complete search history.

(56) References Cited

U.S. PATENT DOCUMENTS

| | | | |
|---|---|---|---|
| 2008/0031498 A1 | 2/2008 | Corcoran et al. | |
| 2012/0120283 A1* | 5/2012 | Capata ............... | G06K 9/00255 348/241 |
| 2012/0140993 A1* | 6/2012 | Bruso ................... | G06F 21/32 382/118 |
| 2014/0118520 A1* | 5/2014 | Slaby ................ | G06K 9/00926 348/77 |

OTHER PUBLICATIONS

International Search Report for Application No. PCT/CN2015/071507, dated Jun. 29, 2015.

* cited by examiner

FACE RECOGNITION METHOD, DEVICE AND COMPUTER READABLE STORAGE MEDIUM

TECHNICAL FIELD

The present disclosure relates to the technical field of terminals, and more particularly to a face recognition method, device and a computer readable storage medium.

BACKGROUND

Smart mobile terminals such as a smart mobile phone and tablet computer have become people's necessities of life. Such terminals are stored with a lot of private information such as images, documents and the like. Meanwhile, mobile terminals have also been used as a tool for expenditure by people, and people's assets such as a bank card also begin to be bound to the mobile terminals. Accordingly, an increasing attention is paid to safe use of these smart mobile terminals. People begin to try a lot of approaches to enhance the safe use of the mobile terminals so as to protect the private information from being easily leaked out.

Generally, there are several approaches of encrypting smart mobile phones, such as setting a digital password, using a set image pattern for encryption and the like. However, a user generally needs to remember an encryption password or pattern of a solution of encrypting the mobile phone, the more complex the password or pattern is, the more complex contents to be remembered is. For example, at present, the mobile phone is encrypted by using a space pattern, this solution generally includes the following contents: at an unlocking pattern setting stage, the user holds the mobile phone to draw a pattern in the air, coordinate information of the mobile phone in the air is obtained by the mobile phone and stored to store the space pattern; at an unlocking stage, a screen of the mobile phone lights up, the user holds the mobile phone to draw the pattern drawn in the setting stage in the air, and then current coordinate information of the mobile phone in the air is obtained and compared with the coordinate information stored at the setting stage, that is, comparing the space pattern currently drawn by the user with the stored space pattern. If the space patterns generated by the two sets of the coordinate information are identical, the mobile phone is unlocked, or else, the mobile phone fails to be unlocked. In such solution of encrypting the mobile phone with patterns, for example the solution of encrypting the mobile phone with the space pattern herein, the user needs to remember the pattern set previously, otherwise the mobile phone cannot be unlocked.

At present, as for the above situation that the user further needs to remember the encryption password or pattern for encrypting the mobile phone, some unique features of a human body can also used to perform encryption, such as fingerprints, iris, human faces and the like. Such approach has many advantages, for example, own unique features of a user are difficult to be copied by other user, and these unique features are recognized and matched automatically by the mobile terminal, without the user to remember a large amount of encryption information.

For example, a present method of unlocking the mobile phone through a face recognition approach mainly includes: at an encryption stage, firstly a face image of a user of a specific position, for example, frontal face, is acquired, and face feature information is obtained after the face image being processed, and then the feature information is stored; at an unlocking stage, a front-facing camera mounted on the mobile phone is used to capture a frontal face image, then the image is analyzed and processed, feature information of the human face is obtained and then compared with feature information of the human face in a mobile phone unlocking information data packet for analysis. The mobile phone exits from a locked state if the obtained feature information of the human face and the feature information of the human face in the unlocking information data packet are consistent with each other. Otherwise, the mobile phone remains in the locked state. Such method is of high security, and can ensure that the information in the mobile phone will not leak due to the loss of the mobile phone to the maximum extent. However, in such a face recognition approach, the user is required to capture an image of the specific location so as to have a better recognition rate.

Therefore, in a face recognition technology for the mobile terminal, it is desired to provide a solution for improving a face recognition rate and a face recognition speed, so as to promote a development of such a biological recognition approach as well as protecting the information security and the property security of the user.

SUMMARY

An embodiment of the present disclosure provides a face recognition method and device capable of improving the face recognition rate and the face recognition speed.

A face recognition method includes the following steps:
capturing face images of a user at a plurality of preset positions respectively;
storing the face images and the preset positions corresponding to the face images;
determining, in face recognition, one of the preset positions where the image is to be captured, and capturing a current face image of the user at the determined preset position;
searching a corresponding stored face image according to the determined preset position; and
determining whether the current face image is matched with the searched face image.

Alternatively, the method further includes the following steps before storing the face images and the preset positions corresponding to the face images:
determining an initial position where a terminal is located;
acquiring respective offset parameters of the terminal relative to the initial position at a time of capturing the face images at the plurality of preset positions, where the offset parameters are used to characterize the preset positions;
the step of storing the face images and the preset positions corresponding to the face images comprises:
storing the face images and the offset parameters corresponding to the face images;
the step of determining one of the preset positions where the image is to be captured comprises:
presenting selectable preset positions to the user according to the stored offset parameters;
determining, according to an instruction input by the user, the preset position where the face image of the user is to be captured.

Alternatively, the method further includes the following steps if the current face image is not matched with the searched face image:
searching a corresponding offset parameter in a storage device according to the preset position selected by the user;

obtaining, according to the offset parameter searched by the user and a current position of the terminal, the initial position where the terminal is located;

acquiring a face image of the user directly when the face recognition is performed again;

determining, according to the obtained initial position and the current position of the terminal, the preset position where the terminal is currently located at the time of capturing an image;

searching a corresponding face image in the storage device according to the preset position, and determining whether the face image currently captured is matched with the searched face image.

Alternatively, the method further includes the following steps prior to acquiring the images:

establishing an initial coordinate system according to the initial position where the terminal is located;

the step of capturing face images of a user at a plurality of preset positions respectively includes:

capturing the face images of the user at the plurality of preset positions relative to the initial coordinate system, respectively;

the step of acquiring offset parameters of the terminal relative to the initial position at a time of capturing the face images at the plurality of preset positions includes:

acquiring the offset parameters of the terminal relative to the initial coordinate system at the time of acquiring the face images at the plurality of preset positions;

the step of obtaining, according to the offset parameter searched in the storage device and a current position of the terminal, the initial position where the terminal is located includes:

establishing a real-time coordinate system according to the current position of the terminal, and recovering the initial coordinate system according to the offset parameter searched in the storage device and the real-time coordinate system;

the step of determining, according to the obtained initial position and the current position information of the terminal, the preset position where the terminal is currently located at the time of acquiring an image includes:

determining, according to the recovered initial coordinate system and the current position information of the terminal, the preset position where the terminal is currently located at the time of acquiring the image.

Alternatively, both the initial coordinate system and the real-time coordinate system are three-dimensional spatial coordinate systems.

Alternatively, the offset parameters include an offset angle and/or a displacement.

Also, in order to solve the above technical problems, the present disclosure further provides a face recognition device, including: an image capturing module, a storage module, a matching module and a position determining module.

The image capturing module is arranged to capture face images of a user at a plurality of preset positions, respectively, and acquire a current face image of the user at the preset position determined by the position determining module.

The storage module is arranged to store the face images and the preset positions corresponding to the face images.

The position determining module is arranged to determine, in face recognition, one of the preset positions where the image is to be captured.

The matching module is arranged to search a corresponding face image in the storage module according to the preset position determined by the position determining module, and determine whether the current face image is matched with the searched face image.

Alternatively, the device further includes an initial position determining module and a parameter acquiring module.

The initial position determining module is arranged to, before the face images and the preset positions corresponding to the face images being stored, determine an initial position where the terminal is located.

The parameter acquiring module is arranged to acquire respective offset parameter of the terminal relative to the initial position at a time of capturing the face images at the plurality of preset positions, where the offset parameters are used to characterize the preset positions.

The storage module is arranged to store the face images and the offset parameters corresponding to the face images.

The position determining module is arranged to present selectable preset positions to the user according to the stored offset parameters, and determine, according to an instruction input by the user, the preset position where the face image of the user is to be captured.

Alternatively, the device further includes an initial position recovering module.

The initial position recovering module is arranged to search a corresponding offset parameter in the storage module according to the preset position selected by the user, and obtain, according to the offset parameter searched by the user and the current position of the terminal, the initial position where the terminal is located.

The image capturing module is arranged to directly capture the face image of the user when the face recognition is performed again.

The position determining module is arranged to determine, according to the initial position obtained by the initial position recovering module and the current position of the terminal, the preset position where the terminal is currently located at the time of acquiring an image.

Alternatively, the device further includes a coordinate establishing module.

The coordinate establishing module is arranged to, prior to capturing the image by the image capturing module, establish an initial coordinate system according to the initial position where the terminal is located, and when the face recognition is performed again, establish a real-time coordinate system according to the current position of the terminal.

The image capturing module is arranged to capture the face images of the user at the plurality of preset positions relative to the initial coordinate system respectively.

The parameter acquiring module is arranged to acquire the offset parameters of the terminal relative to the initial coordinate system at the time of capturing the face images at the plurality of preset positions.

The initial position recovering module is arranged to recover the initial coordinate system according to the offset parameters searched in the storage module and the real-time coordinate system.

The position determining module is arranged to determine, according to the recovered initial coordinate system and the current position information of the terminal, the preset position where the terminal is currently located at the time of acquiring the image.

Alternatively, both the initial coordinate system and the real-time coordinate system are three-dimensional spatial coordinate systems.

Alternatively, the offset parameters include an offset angle and/or a displacement.

An embodiment of the present disclosure further provides a computer-readable storage medium storing a program instruction, where the program instruction, when being executed, may implement above method.

The method of the embodiment of the present disclosure can obtain face images at a plurality of different positions in advance to establish a database. Therefore, in a face recognition process, it is possible for the user terminal to perform recognition through capturing the face image at the plurality of positions, so that a problem that the recognition can merely be performed through capturing an image at one specific position (for example, right ahead of the human face) in the related art is avoided, and the face recognition speed is improved. In addition, more matching data are preset in the method of the present embodiment, including position data and image data. Compared with the single matching data, that is, the image data, in the related art, the face recognition probability can be improved.

DETAILED DESCRIPTION

The present disclosure will be described in detail below in conjunction with specific embodiments and accompanying drawings.

Embodiment I

Figure 1:
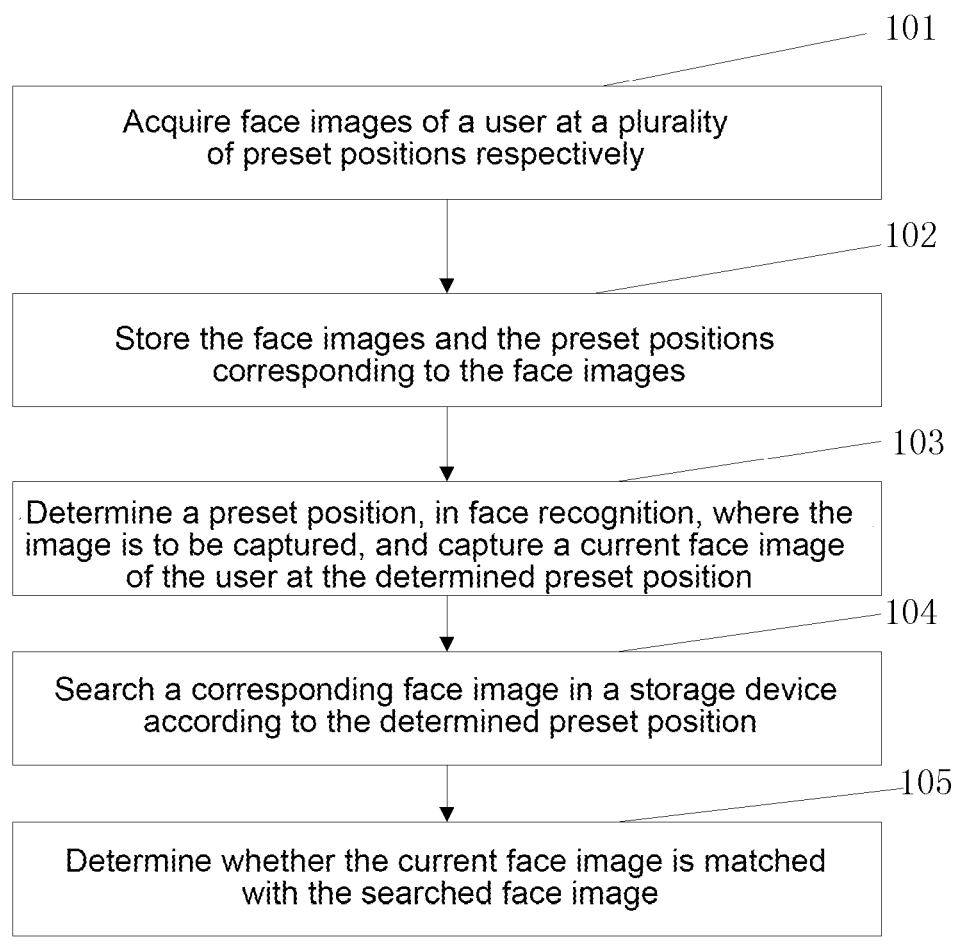
FIG. 1 is a schematic flow diagram of a face recognition method according to embodiment I of the present disclosure.
Figure 2:
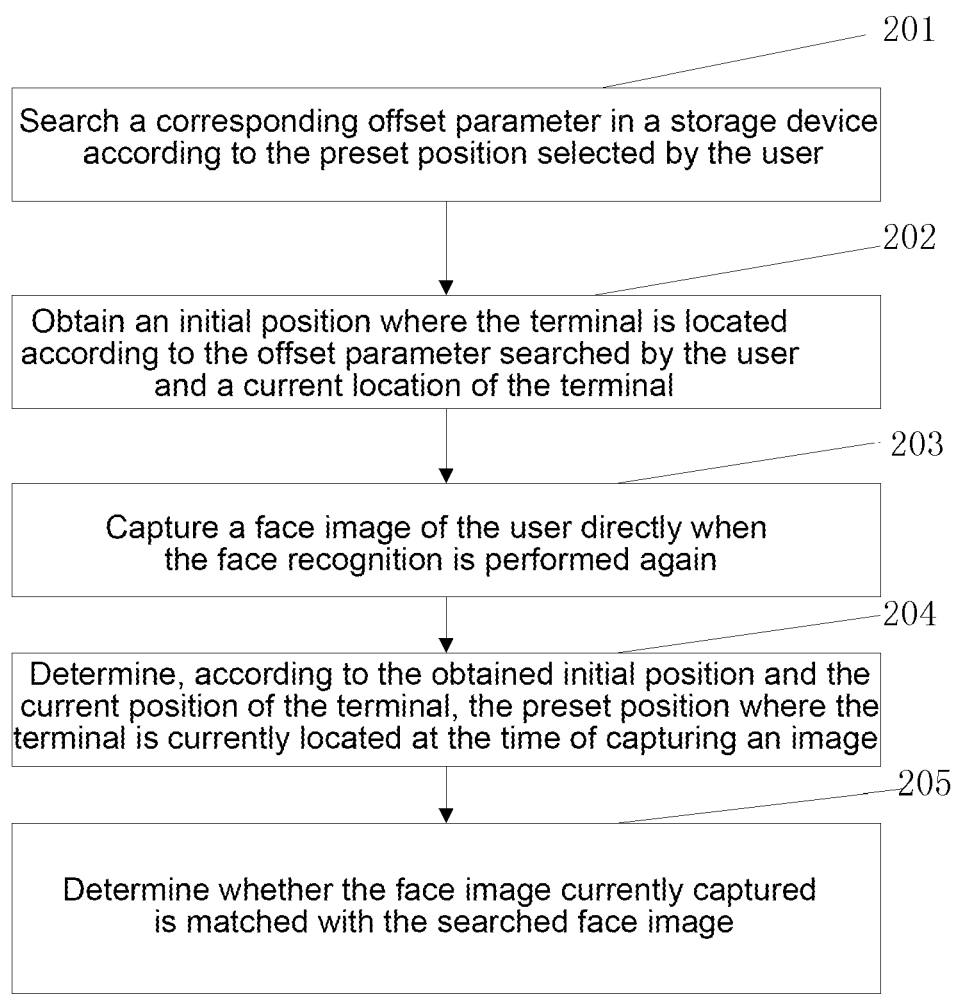
FIG. 2 is a schematic flow diagram of a face recognition method after a first recognition being failed according to embodiment I of the present disclosure.

In view of problems of low recognition rate and low recognition speed of the face recognition technology in the related art, the present embodiment provides a face recognition method, as shown in FIG. 1, including steps described below.

In step 101, face images of a user are respectively captured at a plurality of preset positions.

At a stage of establishing a database, the method of the present embodiment can capture the face images of the user at a plurality of different positions, for example, capturing images of the human face in orientations of upper-left, upper, upper-right, left, middle, right; lower-left, lower and lower-right of the human face.

In the method of the present embodiment, the face images can be captured through an image capturing device such as a camera.

In step 102, the face images and preset positions corresponding to the face images are stored.

In this step, the face images and preset positions corresponding to the face images served as face recognition original data can be stored in a separate storage unit, which cannot be erased and rewritten at will. The storage of the preset positions in the present embodiment refers to storing information that can characterize positions, for example, implementing the storage by acquiring position information through some sensors.

Steps 101~102 of the method of the present embodiment form a process of establishing a face recognition database, which is done prior to face recognition. Steps 101~102 may be performed at an encryption setting stage, for example, the face images can be captured and stored in a process of setting an unlocking password for a mobile phone.

In step 103, one of the preset positions where the image is to be captured is determined in face recognition, and a current face image of the user is captured at the determined preset position.

Since images of a plurality of positions are stored in the method of the present embodiment, when the user performs face recognition, it is necessary to select a position in the preset positions at which an image is to be acquired, and then a face image of the user is captured at the selected position. For example, if the upper-left orientation of the face is selected, the terminal is moved to a position relative to the upper-left orientation of the face to capture a face image.

In step 104, a corresponding stored face image is searched according to the determined preset position.

When the position at which the image is to be acquired by the user is determined, after the image captured at the position is obtained, the terminal will search a prestored preset image corresponding to this position in the storage unit, so as to determine whether the current face image is matched with the searched face image.

In step 105, it is determined whether the current face image is matched with the searched face image.

The face recognition method provided by the present embodiment can be applied to encryption and decryption processes of a terminal or a file or an application, etc., and can perform a preset operation after the matching succeeds, for example, screen unlocking, application decryption, file decryption, etc.

According to the method of the present embodiment, the user can perform face recognition at any one of a plurality of preset positions. Compared with the situation that the face recognition can only be performed at one position in the related art, the face recognition speed is improved. Moreover, the position information and the image are also acquired at the stage of establishing the database, thus the method of the present embodiment has more matching data. Compared with the situation that the recognition is performed by acquiring a single image data in the related art, the probability of face recognition is improved. Therefore, the method of the present embodiment can preferably protect the information security and the property security of the user.

In the method of the present embodiment, a reference position may be used to define the preset positions. Alternatively, in the method of the present embodiment, an initial position may be determined firstly, and then an image is captured at each of the preset positions relative to the initial position to establish a face recognition database. On the basis of the above method, before the face images and preset positions corresponding to the face images are stored, the method of the present embodiment may include the following steps:

an initial position where the terminal is located is determined;

offset parameters of the terminal relative to the initial position at the time of capturing the face images at each of the plurality of preset positions is obtained, where the offset parameters are used to characterize the preset position.

In such a case, the above step 102 may include storing the face images and offset parameters corresponding to the face images.

Further, the above step 103, in which the preset position where the image is to be acquired is determined, may include: presenting selectable preset positions to the user according to the stored offset parameters; and determining the preset position where the face image of the user is to be acquired according to an instruction input by the user.

According to the method of the present embodiment, the initial position where the terminal is located is determined firstly, for example, the terminal is located right ahead of the face; and then an image is captured at a preset position relative to the initial position, meanwhile the offset parameter relative to the initial position at each of the plurality of preset positions is acquired, and the offset parameters are used to characterize the preset positions in the terminal. Alternatively, the offset parameters in the present embodiment may include an offset angle and/or a displacement.

Considering that the user may perform recognition again after a first face recognition fails, thus it further needs to re-select and determine the position to be recognized, which will result in a reduction in face recognition speed and poor user experience. To overcome such problem, in the case that the above matching fails, the method of the present embodiment further includes the following steps.

In step 201, a corresponding offset parameter is searched in the storage unit according to the preset position selected by the user.

Before a second face recognition is performed, the preset position selected by the user in the first face recognition can be used to search a corresponding offset parameter, for example, the offset angle, the displacement relative to the initial position and the like when an image is captured at this position.

In step 202, the initial position where the terminal is located is determined based on the offset parameter searched by the user and a current position of the terminal.

In the method of the present embodiment, after the offset parameter is searched, the offset parameter and the current position of the terminal can be used to recover the initial position of the terminal, i.e., the reference position.

In step 203, when the face recognition is performed again, a face image of the user is directly captured.

When the second or later face recognition is performed, the user can capture a face image with the terminal at any position, without selecting a position where the terminal is to be located for capturing and recognition.

In step 204, the preset position where the terminal is currently located at the time of capturing an image is determined based on the obtained initial position and the current position of the terminal.

After recovering the initial position, i.e., the reference position, the method of the present embodiment enables the terminal to automatically determine a position where the image is to be captured for face recognition. Therefore, in the method of the present embodiment, the step of selecting the position by the user when the recognition is performed again, can be omitted, thereby improving the face recognition speed.

In step 205, a corresponding face image is searched in the storage unit according to the preset position, and it is determined whether the currently captured face image is matched with the searched face image.

Specifically, after a position for recognition is automatically determined by the terminal, it is possible to search a preset face image in the database according to this position, and then perform matching.

Figure 3:
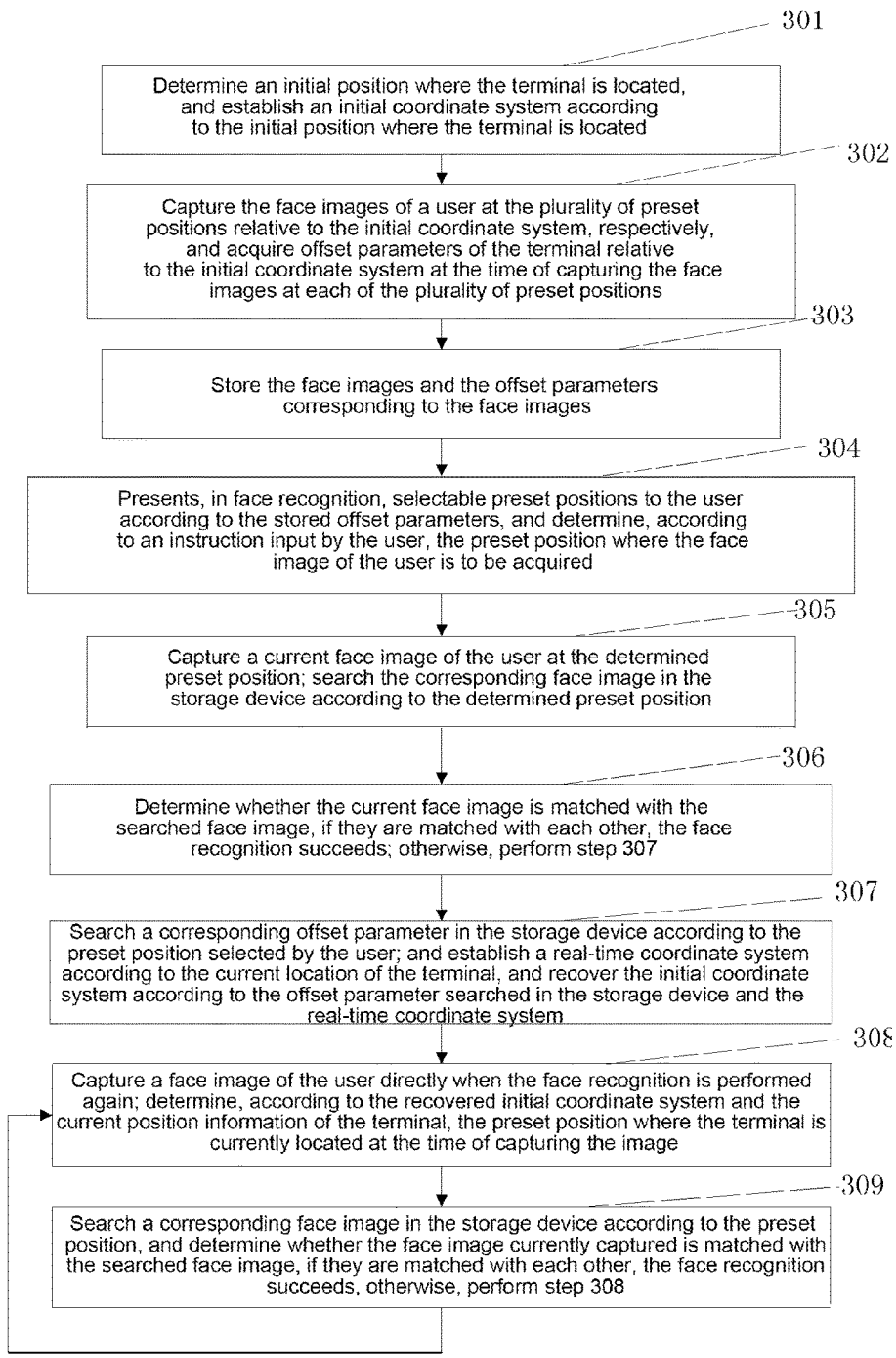
FIG. 3 is a schematic flow diagram of another face recognition method according to embodiment I of the present disclosure.

In the present embodiment, the position may be represented or calculated through parameters by establishing a coordinate system. Specifically, as shown in FIG. 3, the face recognition method of the present embodiment may include the following steps.

In step 301, an initial position where the terminal is located is determined, and an initial coordinate system is established according to the initial position where the terminal is located.

In the method of the present embodiment, a display screen of the terminal may be parallel with the human face and the initial position is right ahead of the human face, and then a three-dimensional space coordinate system XYZ is established according to the initial position.

In step 302, a face image of the user is captured at a plurality of preset positions relative to the initial coordinate system respectively, and the offset parameters of the terminal relative to the initial coordinate system at the time of acquiring the face images at the plurality of preset positions, are acquired.

For example, with the above coordinate system XYZ as a reference, the face image may be captured in orientations of upper-left, upper, upper-right; left, middle, right, lower-left, lower and lower-right and the like of the human face. Meanwhile, an offset parameter relative to the coordinate system XYZ in each of the plurality of orientations may be measured through a three-axis gyroscope and a three-axis acceleration sensor of the terminal, for example, a rotation offset angle and a displacement.

In step 303, the face imagef and offset parameters corresponding to the face images are stored.

After being captured or measured, images captured in the plurality of orientations are stored, and data about the rotation offset angle and the displacement in each orientation is correspondingly recorded. These data are used as initial data for face recognition.

In step 304, when performing face recognition, selectable preset positions are presented to the user according to the stored offset parameters, and a preset position where the face image of the user is to be captured is determined according to an instruction input by the user.

A camera is activated by the terminal, and one of the orientations of upper-left, upper, upper-right, left, middle, right, lower-left, lower and lower-right and the like is selected as the capturing orientation, and then the face image is captured in the selected orientation.

In step 305, a current face image of the user is captured at the determined preset position, and a corresponding face image is searched in the storage unit according to the determined preset position.

The terminal can search the corresponding face image in the database according to the selected orientation to determine whether the currently captured face image is matched with the corresponding face image.

In step 306, it is determined whether the current face image is matched with the searched face image. If the current face image is matched with the searched face image, the face recognition of the terminal succeeds. Otherwise, the process proceeds to step 307.

In step 307, a corresponding offset parameter is searched in the storage unit according to the preset position selected by the user; and a real-time coordinate system is established according to the current position of the terminal, and the initial coordinate system is recovered according to the offset parameter obtained from the storage unit and the real-time coordinate system.

After the first recognition fails, the terminal can search the rotation offset angle and the displacement corresponding to the orientation selected by the user, and establish a coordinate system X'Y'Z' according to the current position of the terminal. Then, a coordinate system right ahead of the human face, that is, the coordinate system XYZ, is recovered according to the searched rotation offset angle and the displacement and the coordinate system X'Y'Z'.

In step 308, when the face recognition is performed again, the face image of the user is directly captured; the preset position where the terminal is currently located at the time of acquiring the image is determined according to the recovered initial coordinate system and the current position information of the terminal.

When the user performs the second face recognition, that is, performs the recognition again, the image matching can be quickly performed based on the recovered coordinate system, without selecting a capturing orientation by the user.

In step 309, a corresponding face image is searched in the storage unit according to the preset position, and it is determined whether the currently captured face image is matched with the searched face image. If the currently acquired face image is matched with the searched face image, the face recognition of the terminal succeeds, otherwise, the process returns to step 308.

Figure 4:
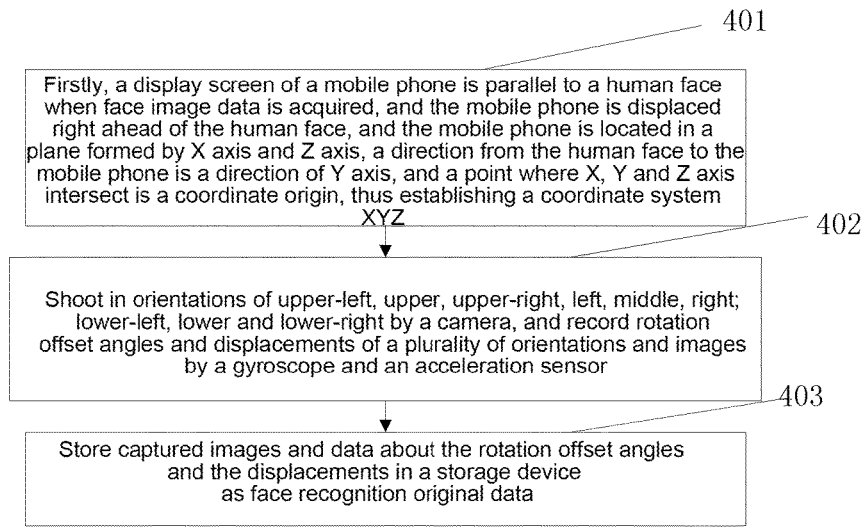
FIG. 4 is a schematic flow diagram of establishing a three-dimensional face image database according to embodiment I of the present disclosure.

In the following, a particular example is given to illustrate a process of establishing a three-dimensional face image database according to the method of the present embodiment, in which a three-dimensional face image is obtained through a front-facing camera, a three-axis gyroscope and a three-axis acceleration sensor. As shown in FIG. 4, the process includes the following steps.

In step 401, when face image data is acquired, a display screen of a mobile phone is enabled to be parallel to a human face firstly, and is displaced right ahead of the human face. The mobile phone is located in a plane formed by X axis and Z axis, a direction from the human face to the mobile phone is a direction of Y axis, and a point where X axis, Y axis and Z axis intersect is a coordinate origin, thus a coordinate system XYZ is established.

Figure 5:
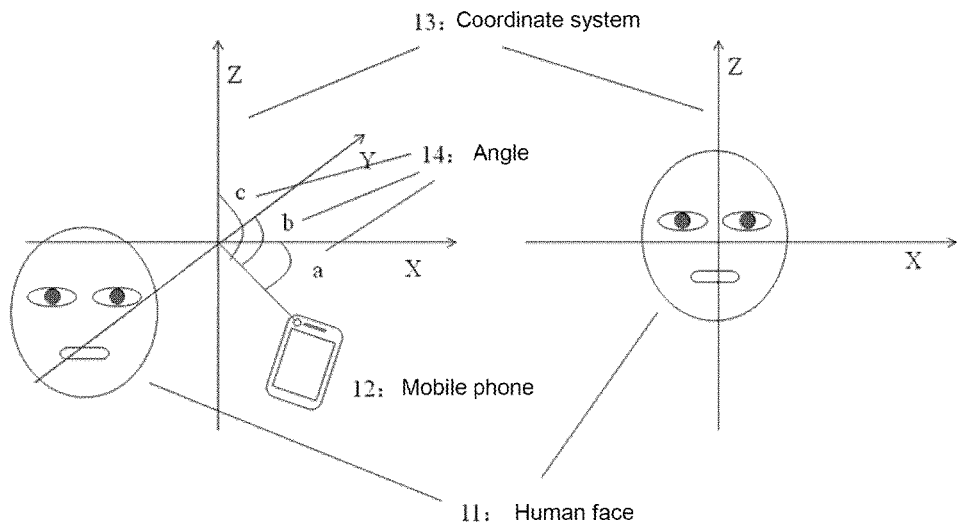
FIG. 5 is a schematic diagram of a mobile phone, a human face and a coordinate system according to embodiment I of the present disclosure.
Figure 6:
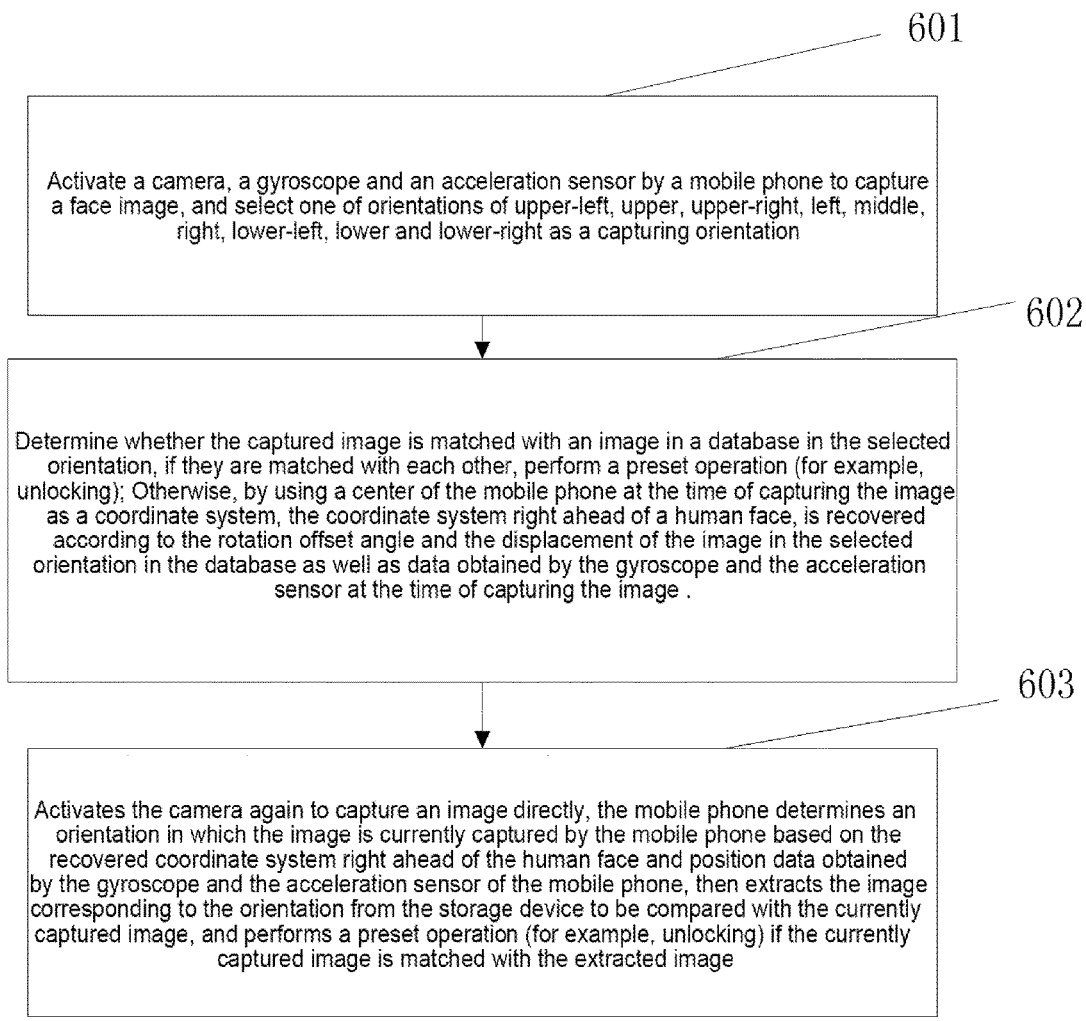
FIG. 6 is a schematic flow diagram of performing face recognition by a mobile phone according to embodiment I of the present disclosure.

FIG. 5 is a schematic diagram illustrating a mobile phone, a human face and a coordinate system, in which 11 indicates the human face, 12 indicates the mobile phone, 13 indicates the coordinate system, 14 indicates an offset angle of the mobile phone relative to the coordinate system, 55 indicates a displacement of the mobile phone relative to the coordinate system.

In step 402, images are captured in orientations of upper-left, upper, upper-right, left, middle, right, lower-left, lower and lower-right through a camera, and rotation offset angles and displacements of a plurality of orientations, which correspond to the images, are recorded through a gyroscope and an acceleration sensor.

In step 403, the captured images and data about the rotation offset angles and the displacements are stored in a storage unit as initial face recognition data.

Figure 7:
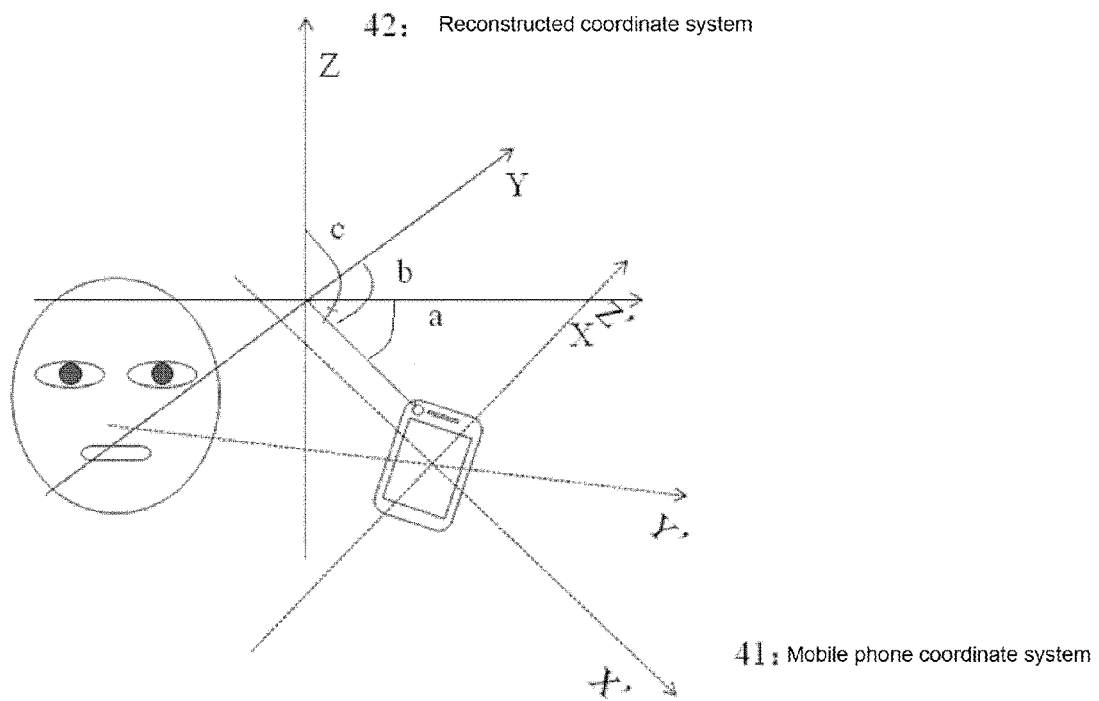
FIG. 7 is a schematic diagram of a recovery coordinate system according to embodiment I of the present disclosure.

On the basis of the above example, a face recognition process in the method of the present embodiment is described below. As shown in FIG. 7, the face recognition process includes the following steps.

In step 601, the camera, gyroscope and acceleration sensor are activated by the mobile phone so as to capture a face image, and one of orientations of upper-left, upper, upper-right, left, middle, right, lower-left, lower and lower-right is selected as a capturing orientation.

In step 602, it is determined whether the captured image is matched with the image for the selected orientation in the database. If the captured image is matched with the image for the selected orientation in the database, a preset operation (for example, unlocking) is performed. Otherwise, by using a center of the mobile phone at the time of capturing the image as a coordinate system, the coordinate system right ahead of a human face, is recovered according to the rotation offset angle and the displacement of the image in the selected orientation in the database as well as data obtained by the gyroscope and the acceleration sensor at the time of capturing the image.

FIG. 7 is a schematic diagram illustrating recovering the coordinate system. When the face recognition is performed through the mobile phone, a coordinate system of the mobile phone is X'Y'Z' (referring to 41), the rotation offset angle and the displacement of the image stored in the storage unit in this orientation are extracted according to the orientation selected in step 401, the data obtained by the gyroscope and the acceleration sensor when the image is captured, is acquired; and then the coordinate system XYZ (referring to 42, that is, a reconstructed coordinate system) right ahead of the human face is recovered.

In step 603, the camera is activated again to directly capture an image, the mobile phone determines an orientation in which the image is currently captured by the mobile phone based on the recovered coordinate system right ahead of the human face and position data obtained by the gyroscope and the acceleration sensor of the mobile phone, then extracts the image corresponding to the orientation from the storage unit to be compared with the currently captured image, and performs a preset operation (for example, unlocking) if the currently captured image is matched with the extracted image.

According to the method, three-dimensional human face image data may be established, thus there exists more matching data at the time of face recognition, and the face recognition probability is improved. Meanwhile, different orientation data where the data of the human face is located may be obtained through the gyroscope and the acceleration sensor, so that the face recognition rate is improved.

Embodiment II

Figure 8:
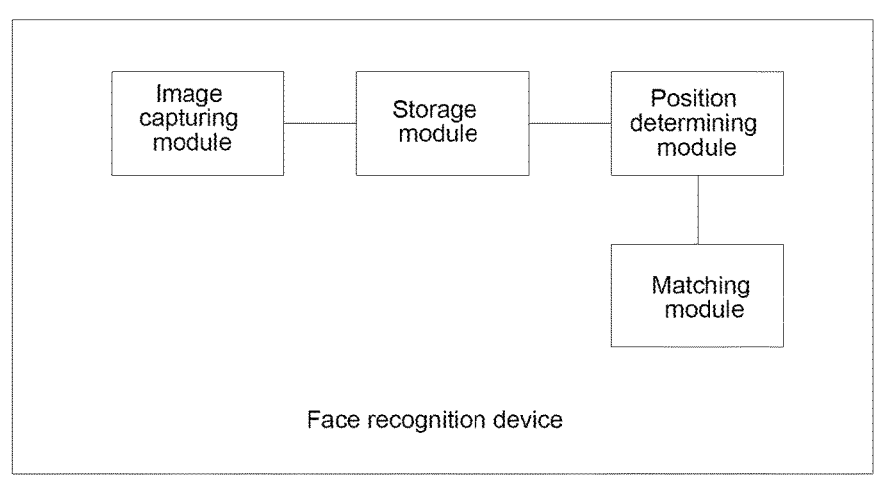
FIG. 8 is a schematic structural diagram of a first face recognition device according to embodiment II of the present disclosure.

As shown in FIG. 8, the present embodiment further provides a face recognition device, including an image capturing module, a storage module, a matching module and a position determining module.

The image capturing module is arranged to capture face images of a user at a plurality of preset positions respectively, and capture a current face image of the user at a preset position determined by the position determining module.

The storage module is arranged to store the face images and preset positions corresponding to the face images.

The position determining module is arranged to determine a preset position where the image is to be captured in face recognition.

The matching module is arranged to search a corresponding face image in the storage module according to the preset position determined by the position determining module, and determine whether the current face image is matched with the searched face image.

The device provided by the present embodiment can capture the face image at a plurality of different positions in advance to establish a database. Therefore, in a face recognition process, it is possible for the user terminal to perform recognition through capturing the face image at the plurality of positions, so that a problem that the recognition can merely be performed through capturing an image at one specific position (for example, right ahead of the human face) in the related art is avoided, and the face recognition speed is improved. In addition, more matching data are preset in the device of the present embodiment, including position data and image data. Compared with the single matching data, that is, the image data, in the related art, the face recognition probability can be improved.

Figure 9:
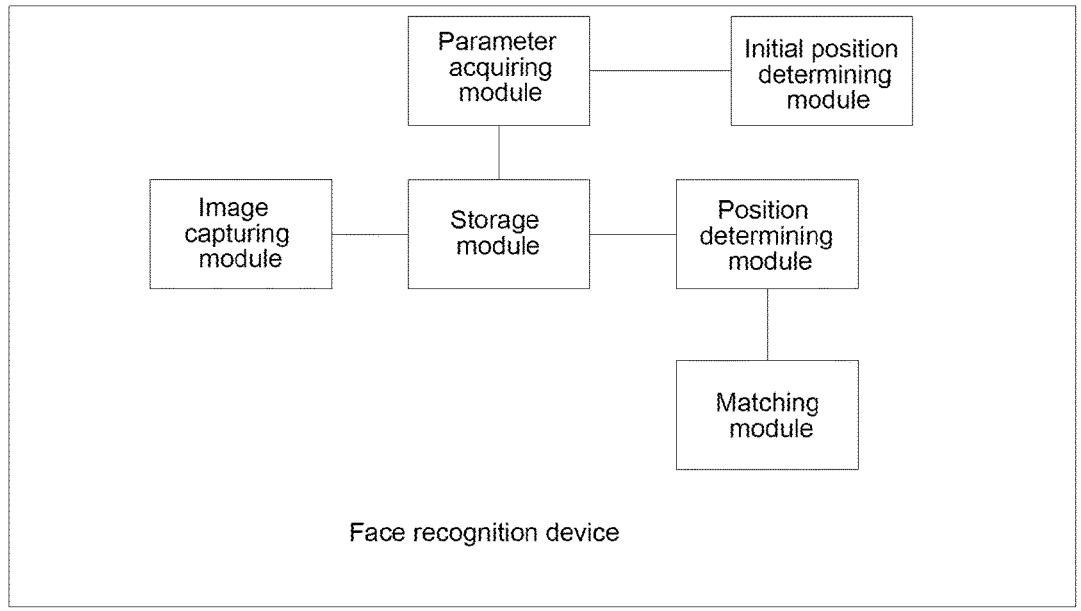
FIG. 9 is a schematic structural diagram of a second face recognition device according to embodiment II of the present disclosure.

Alternatively, as shown in FIG. 9, the above device further includes an initial position determining module and a parameter acquiring module.

The initial position determining module is arranged to, before the face images and the preset positions corresponding to the face image are stored, determine an initial position where the terminal is located.

The parameter acquiring module is arranged to acquire offset parameters of the terminal relative to the initial position at a time when the face image is captured at the plurality of preset positions respectively, where the offset parameters are used to characterize the preset positions.

The storage module is arranged to store the face images and the offset parameters corresponding to the face images.

The position determining module is arranged to present selectable preset positions to the user according to the stored offset parameters, and determine the preset position where the face image of the user is to be captured according to an instruction input by the user.

Figure 10:
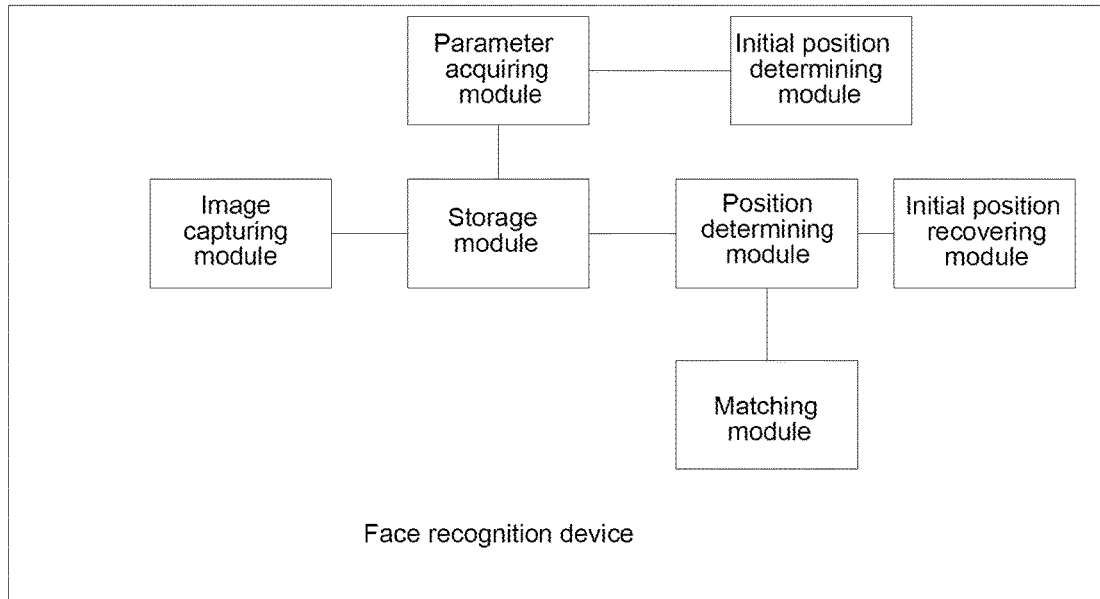
FIG. 10 is a schematic structural diagram of a third face recognition device according to embodiment II of the present disclosure.

Alternatively, as shown in FIG. 10, on the basis of the device of FIG. 9, the above device further includes an initial position recovering module.

The initial position recovering module is arranged to search the corresponding offset parameter in the storage module according to the preset position selected by the user, and obtain, according to the offset parameter searched by the user and a current location of the terminal, the initial position where the terminal is located.

The image capturing module is arranged to directly acquire a face image of the user when the face recognition is performed again.

The position determining module is arranged to determine, according to the initial position obtained by the initial position recovering module and the current position of the terminal, the preset position where the terminal is currently located at the time of acquiring an image.

Figure 11:
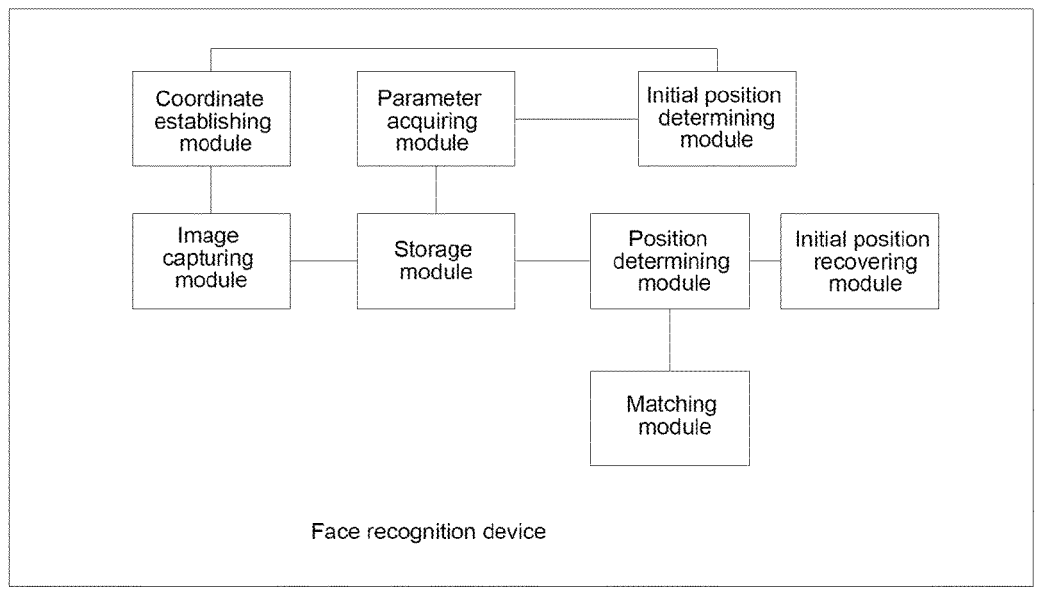
FIG. 11 is a schematic structural diagram of a fourth face recognition device according to embodiment II of the present disclosure.

Alternatively, as shown in FIG. 11, on the basis of the device of FIG. 10, the above device further includes a coordinate establishing module.

The coordinate establishing module is arranged to, before the image is captured by the image capturing module, establish an initial coordinate system according to the initial position where the terminal is located; and when the face recognition is performed again, establish a real-time coordinate system according to the current position of the terminal.

The image capturing module is arranged to capture the face image of the user at the plurality of preset positions relative to the initial coordinate system, respectively.

The parameter acquiring module is arranged to acquire the offset parameter of the terminal relative to the initial coordinate system at the time when the face image is captured at the plurality of preset positions.

The initial position recovering module is arranged to recover the initial coordinate system according to the offset parameter acquired from the storage module and the real-time coordinate system.

The position determining module is arranged to determine, according to the recovered initial coordinate system and current position information of the terminal, the preset position where the terminal is currently located at the time of acquiring the image.

Alternatively, both the initial coordinate system and the real-time coordinate system are three-dimensional spatial coordinate systems.

Alternatively, the offset parameter includes an offset angle and/or a displacement.

With the device of the present embodiment, the face recognition rate and the face recognition speed can be improved, and the development of such a biometric recognition approach is preferably promoted, and the information security and the property safety can be preferably protected.

It will be understood by those ordinary skilled in the art that all or a portion of steps of the embodiments described above may be implemented by a computer program flow. The computer program may be stored in a computer-readable storage medium. The computer program is executed on a corresponding hardware platform (such as a system, a device, an apparatus, a means, etc.). The computer program, when being executed, includes one or a combination of steps of the method embodiment.

Alternatively, all or a portion of steps of the embodiment described above may also be implemented by an integrated circuit, these steps may be separately made into integrated circuit modules or a plurality of modules or steps are made into a single integrated circuit module. In this way, the present disclosure is not limited to any particular combination of hardware and software.

The devices/functional modules/functional units in the above embodiment may be implemented by using a general-purpose computing device, which may be integrated on a single computing device or may be distributed over a network formed by a plurality of computing devices.

The devices/functional modules/functional units in the above embodiment can be implemented in a form of a software functional module and sold or used as a stand-alone product, and may be stored in a computer-readable storage medium. The above-mentioned computer-readable storage medium may be a read-only memory, a disk or an optical disk and the like.

INDUSTRIAL APPLICABILITY

A face recognition method and device provided by the embodiment of the present disclosure can improve the face recognition rate and face recognition speed.

What is claimed is:

1. A face recognition method, comprising:
determining an initial position where a terminal is located;
capturing face images of a user at a plurality of preset positions of the terminal respectively;
acquiring respective offset parameters of the terminal relative to the initial position at a time of capturing the face images at the plurality of preset positions, wherein the offset parameters are used to characterize the preset positions;
storing the face images and the offset parameters corresponding to the face images;
presenting, in face recognition, selectable preset positions to the user according to the stored offset parameters;
determining, according to an instruction input by the user, the preset position where the face image of the user is to be captured;
capturing a current face image of the user at the determined preset position;
searching a corresponding stored face image according to the determined preset position; and
determining whether the current face image is matched with the searched face image.

2. The face recognition method according to claim 1, further comprising the following steps if the current face image is not matched with the searched face image:
searching a corresponding offset parameter in a storage device according to the determined preset position;
obtaining, according to the offset parameter searched in the storage device and a current position of the terminal, the initial position where the terminal is located;
acquiring a face image of the user directly when the face recognition is performed again;
determining, according to the obtained initial position and the current position of the terminal, the preset position where the terminal is currently located at the time of capturing an image;
searching a corresponding face image in the storage device according to the preset position, and determining whether the face image currently captured is matched with the searched face image.

3. The face recognition method according to claim 2, further comprising the following steps prior to capturing the images at the plurality of preset positions: establishing an initial coordinate system according to the initial position where the terminal is located;
wherein the step of capturing face images of a user at a plurality of preset positions of the terminal respectively comprises:
capturing the face images of the user at the plurality of preset positions of the terminal relative to the initial coordinate system, respectively;
the step of acquiring offset parameters of the terminal relative to the initial position at a time of capturing the face images at the plurality of preset positions comprises:
acquiring the offset parameters of the terminal relative to the initial coordinate system at the time of acquiring the face images at the plurality of preset positions;
the step of obtaining, according to the offset parameter searched in the storage device and a current position of the terminal, the initial position where the terminal is located comprises:
establishing a real-time coordinate system according to the current position of the terminal, and recovering the initial coordinate system according to the offset parameter searched in the storage device and the real-time coordinate system;
the step of determining, according to the obtained initial position and the current position of the terminal, the preset position where the terminal is currently located at the time of acquiring an image comprises:
determining, according to the recovered initial coordinate system and the current position of the terminal, the preset position where the terminal is currently located at the time of acquiring the image.

4. The face recognition method according to claim 3, both the initial coordinate system and the real-time coordinate system are three-dimensional spatial coordinate systems.

5. The face recognition method according to claim 4 wherein the offset parameters comprise at least one of an offset angle and a displacement.

6. The face recognition method according to claim 2 wherein the offset parameters comprise at least one of an offset angle and a displacement.

7. The face recognition method according to claim 3 wherein the offset parameters comprise at least one of an offset angle and a displacement.

8. The face recognition method according to claim 1 wherein the offset parameters comprise at least one of an offset angle and a displacement.

9. A non-statutory computer-readable storage medium storing a program instruction, wherein the program instruction, when being executed, can implement the method according to claim 1.

10. A face recognition device, comprising a processor arranged to perform the steps in following modules: an image capturing module, a storage module, a matching module, a position determining module, an initial position determining module and a parameter acquiring module;
wherein the image capturing module is arranged to capture face images of a user at a plurality of preset positions of a terminal, respectively, and acquire a current face image of the user at the preset position determined by the position determining module;
the storage module is arranged to store the face images and offset parameters corresponding to the face images;
the position determining module is arranged to present selectable preset positions to the user according to the stored offset parameters, and determine, according to an instruction input by the user, the preset position where the face image of the user is to be captured;
the matching module is arranged to search a corresponding face image in the storage module according to the preset position determined by the position determining module, and determine whether the current face image is matched with the searched face image;
the initial position determining module is arranged to, before the face images and the preset positions corresponding to the face images being stored by the storage module, determine an initial position where the terminal, to which the face recognition device is applied, is located;
the parameter acquiring module is arranged to acquire respective offset parameters of the terminal relative to the initial position at a time of capturing the face images at the plurality of preset positions, wherein the offset parameters are used to characterize the preset positions.

11. The face recognition device according to claim 10, wherein the processor is further arranged to perform the steps in an initial position recovering module;

the initial position recovering module is arranged to search a corresponding offset parameter in the storage module according to the determined preset position, and obtain, according to the offset parameter searched in the storage module and the current position of the terminal, the initial position where the terminal is located;

the image capturing module is arranged to directly capture the face image of the user when the face recognition is performed again; and the position determining module is arranged to determine, according to the initial position obtained by the initial position recovering module and the current position of the terminal, the preset position where the terminal is currently located at the time of acquiring an image.

12. The face recognition device according to claim 11, wherein the processor is further arranged to perform the steps in a coordinate establishing module;

wherein the coordinate establishing module is arranged to, prior to capturing the image by the image capturing module, establish an initial coordinate system according to the initial position where the terminal is located, and when the face recognition is performed again, establish a real-time coordinate system according to the current position of the terminal;

the image capturing module is arranged to capture the face images of the user at the plurality of preset positions of the terminal relative to the initial coordinate system respectively;

the parameter acquiring module is arranged to acquire the offset parameters of the terminal relative to the initial coordinate system at the time of capturing the face images at the plurality of preset positions;

the initial position recovering module is arranged to recover the initial coordinate system according to the offset parameters searched in the storage module and the real-time coordinate system; and the position determining module is arranged to determine, according to the recovered initial coordinate system and the current position of the terminal, the preset position where the terminal is currently located at the time of acquiring the image.

13. The face recognition device according to claim 12, wherein both the initial coordinate system and the real-time coordinate system are three-dimensional spatial coordinate systems.

14. The face recognition device according to claim 13, wherein the offset parameters comprise at least one of an offset angle and a displacement.

15. The face recognition device according to claim 11, wherein the offset parameters comprise at least one of an offset angle and a displacement.

16. The face recognition device according to claim 12, wherein the offset parameters comprise at least one of an offset angle and a displacement.

17. The face recognition device according to claim 10, wherein the offset parameters comprise at least one of an offset angle and a displacement.

18. The face recognition device according to claim 10, wherein the offset parameters comprise at least one of an offset angle and a displacement.

* * * * *